United States Patent [19]

Summers et al.

[11] Patent Number: 4,537,475

[45] Date of Patent: Aug. 27, 1985

[54] SCATTERING APODIZER FOR LASER BEAMS

[75] Inventors: Mark A. Summers; Wilhelm F. Hagen; Robert D. Boyd, all of Livermore, Calif.

[73] Assignee: The United States of America as represented by the United States Department of Energy, Washington, D.C.

[21] Appl. No.: 481,411

[22] Filed: Apr. 1, 1983

[51] Int. Cl.³ ................... G02B 3/00; G02B 27/46
[52] U.S. Cl. ........................... 350/448; 350/162.12
[58] Field of Search ............... 350/448, 451, 162.12

[56] References Cited

U.S. PATENT DOCUMENTS

| | | | |
|---|---|---|---|
| 3,867,017 | 2/1975 | Bliss et al. | 350/205 |
| 4,013,338 | 3/1977 | Sato et al. | 350/314 X |
| 4,030,817 | 6/1977 | Westell | 350/448 X |
| 4,339,177 | 7/1982 | March | 350/448 X |
| 4,469,407 | 9/1984 | Cowan et al. | 350/448 X |

OTHER PUBLICATIONS

Costich et al; "Apertures to Shape Highpower Beams"; *Laser Focus;* Sep. 1974; pp. 43-46.
Simmons et al; "Optical Beam Shaping Device Using Polarization Effects"; *Applied Optics;* vol. 13, No. 7; Jul. 1974; pp. 1629-1632.
Wolf; *Progress in Optics;* vol. III; 1964; pp. 31-39; North-Holland Publ. Co.; Amsterdam.

*Primary Examiner*—John K. Corbin
*Assistant Examiner*—Scott J. Sugarman
*Attorney, Agent, or Firm*—Clifton E. Clouse, Jr.; Roger S. Gaither; Judson R. Hightower

[57] ABSTRACT

A method is disclosed for apodizing a laser beam to smooth out the production of diffraction peaks due to optical discontinuities in the path of the laser beam, such method comprising introduction of a pattern of scattering elements for reducing the peak intensity in the region of such optical discontinuities, such pattern having smoothly tapering boundaries in which the distribution density of the scattering elements is tapered gradually to produce small gradients in the distribution density, such pattern of scattering elements being effective to reduce and smooth out the diffraction effects which would otherwise be produced. The apodizer pattern may be produced by selectively blasting a surface of a transparent member with fine abrasive particles to produce a multitude of minute pits. In one embodiment, a scattering apodizer pattern is employed to overcome diffraction patterns in a multiple element crystal array for harmonic conversion of a laser beam. The interstices and the supporting grid between the crystal elements are obscured by the gradually tapered apodizer pattern of scattering elements.

7 Claims, 3 Drawing Figures

SCATTERING APODIZER FOR LASER BEAMS

The U.S. Government has rights in this invention pursuant to prime contract No. W-7405-ENG-48 between the U.S. Department of Energy and the University of California.

FIELD OF THE INVENTION

This invention relates to a method and apparatus for apodizing a laser beam to minimize or smooth out the evolution of diffraction peaks in the laser beam due to optical discontinuities in the path traversed by the laser beam. Such optical discontinuities may be produced by optical devices which are employed to process the laser beam.

BACKGROUND OF THE INVENTION

Various optical devices, employed to process laser beams, may introduce optical discontinuities in the path of the laser beam. Such optical discontinuities tend to produce diffraction effects, so that diffraction peaks are introduced onto the laser beam. Such diffraction peaks are undesirable and can rise to intensity levels which are sufficiently great to cause damage to the laser system.

Although various optical devices may introduce such optical discontinuities, one specific example will be discussed in some detail. Such example may take the form of a harmonic conversion device having a multi-element crystal array for a large aperture laser system. Such harmonic conversion devices are known and used for the purpose of converting a fundamental frequency input laser beam into a second or third harmonic output laser beam, for example. In such devices, the harmonic conversion may be produced by known or suitable crystal materials, such as KDP (potassium dihydrogen phosphate). KDP crystals are grown to fairly large sizes. However, for large aperture laser systems it is generally necessary to employ a multi-element crystal array in a harmonic conversion device. For example, in a large laser system having a 74 cm output aperture, it has been necessary to construct arrays comprising from 9 to 25 square KDP crystal elements. The interstices between the elements introduce optical discontinuities which produce diffraction effects in in the laser beam. A supporting grid often provided between the inerstices between the crystal elements, referred to as an "egg crate", also introduces optical discontinuities which tend to produce diffraction effects, including diffraction peaks.

OBJECTS OF THE INVENTION

The general object of the present invention is to provide a method and apparatus for smoothing out or apodizing the production of diffraction effects in a laser beam due to optical discontinuities in the path of the beam, so as to avoid or minimize diffraction peaks, which might otherwise become sufficiently intense to damage the laser system.

A further object is to provide an apodizing method and apparatus which can be implemented without undue complexity and at low cost, yet very effectively and efficiently.

SUMMARY OF THE INVENTION

To achieve these and other objects, the present invention preferably provides a method of apodizing a laser beam to smooth out the production of diffraction peaks due to optical discontinuities in the path of the laser beam, comprising introducing a pattern of scattering elements for recuding the peak intensity of the optical discontinuities. Each minute scattering element produces minute diffraction fringes, but the multitude of diffraction fringes produced by all of the scattering elements meld together, so that the net effect is to virtually eliminate intense diffraction peaks. Such a pattern has smoothly tapering boundaries in which the distribution density of the scattering elements is tapered gradually to produce small gradients in the distribution density of the scattering elements, the pattern of scattering elements being effective to reduce and smooth out the diffraction effects produced by the optical discontinuities.

As to apparatus, the invention preferably provides a scattering apodizer for smoothing and minimizing diffraction effects in a laser beam due to an optical discontinuity in the path of the beam, such scattering apodizer comprising a transparent member having a pattern of scattering elements thereon for reducing the peak intensity in the region of the optical discontinuity, such pattern having a central portion and boundary portions, such scattering elements having a distribution density which is at a maximum in the central portion and which tapers gradually to zero in the boundary portions to afford a small gradient in the distribution density.

The present invention may be embodied in an optical device for processing a laser beam, comprising an array of crystal elements for modifying the laser beam, such crystal elements having optical discontinuities therebetween tending to cause diffraction peaks in the laser beam, and at least one scattering apodizer having a pattern of scattering elements for reducing the peak intensity in the region of at least the optical discontinuities, such pattern having a main portion and boundary portions, such scattering elements having a distribution density which is at a maximum in such main portion and which tapers gradually to zero in such boundary portions to afford a smooth gradient of the scattering element distribution density.

The apodizer may comprise a transparent member having a surface on which such pattern of scattering elements is formed. Such scattering elements may be in the form of minute pits on such surface.

In such optical device, the optical discontinuities may be in the form of interstices between the crystal elements. The pattern of scattering elements may correspond in shape to the layout of such interstices. A supporting grid may occupy such interstices and may also be apodized by such scattering elements. One such apodizer may be provided on either or both opposite sides of the crystal array.

In the method of this invention, the scattering elements may be produced by forming a multiplicity of such scattering elements on the surface of a transparent window. The forming may be accomplished by selectively blasting the surface of the window with fine abrasive particles, which may be made of aluminum oxide, for example.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENT

Figure 1:
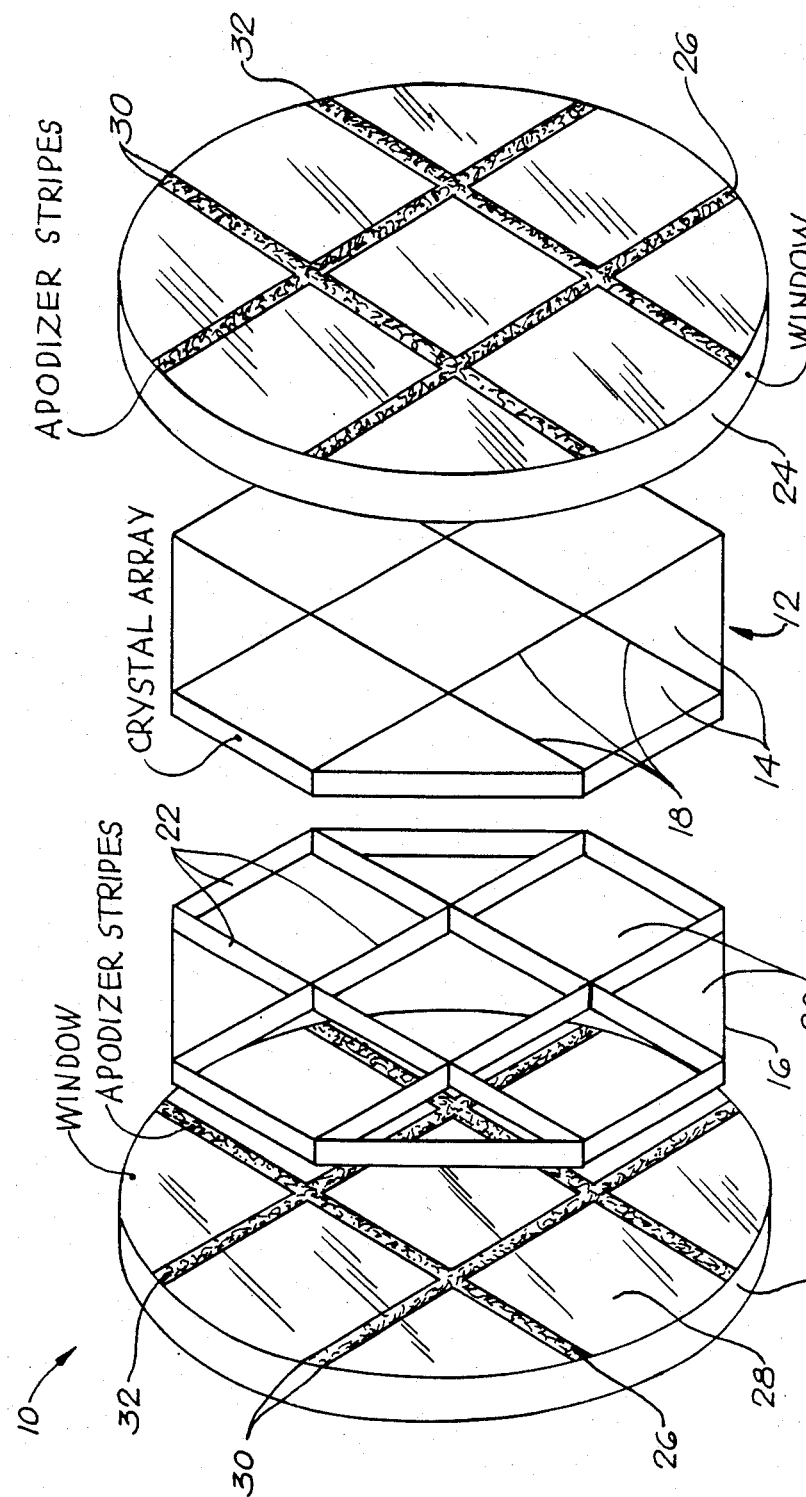
FIG. 1 is a diagrammatic, exploded perspective view showing an optical device including a scattering apodizer to be described as an illustrative embodiment of the present invention, such optical device being a harmonic conversion device for processing the laser beam.

The present invention may be embodied in various optical devices for processing laser beams. By way of example, an illustrative embodiment of such an optical device 10 is shown in FIG. 1. The device 10 takes the form of a harmonic conversion device for converting an input laser beam at a fundamental frequency into an output laser beam at a harmonic frequency, such as a second or third harmonic. Generally speaking, such harmonic conversion devices are known in the laser art. The harmonic conversion may be accomplished by one or more crystal elements, of any known or suitable composition, such as grown crystals of KDP (potassium dihydrogen phosphate). In the optical device 10 of FIG. 1, the harmonic conversion is accomplished by a crystal array 12 comprising a plurality of crystal elements 14 in the form of plates cut from KDP or other suitable crystals. The illustrated crystal elements 14 are square or triangular in shape and are fitted together like tiles. The crystal array 12, utilizing a multiplicity of crystal elements, is employed in order to achieve a large aperture, larger than can readily be achieved by utilizing a single monolithic crystal element.

The crystal array 12 is preferably supported by a supporting grid 16 which occupies the interstices 18 between the crystal elements 14. The supporting grid 16 is often referred to as the "egg crate", because of its shape, with a multiplicity of cells 20 and dividers 22. The dividers may for example be made of glass or aluminum.

FIG. 1 is an exploded view, in which the crystal elements 14 are shown separately from the supporting grid 16, but the optical device 10 is normally assembled with the crystal elements 14 fitted into the cells 20 of the grid 16. The interstices 18 between the crystal elements 14 are occupied by the dividers 22. This assembly, comprising the crystal array 12 and the grid 16, is retained between two parallel transparent windows 24, which may be made of suitable glass, such as borosilicate glass or fused silica. In accordance with the usual practice, all of the voids in this assembly are preferably filled with a transparent liquid having an index of refraction which is comparable with the indices of the windows 24 and the crystal elements 14. For example, such liquid may be a suitable halocarbon oil. Such oils are commercially available. The assembly of FIG. 1 is mounted in a suitable housing, not shown for clarity of illustration, which retains the liquid.

The interstices 18 and the supporting grid 16 occupying such interstices between the crystal elements 14 constitute optical discontinuities in the path of the laser beam. Such optical discontinuities tend to produce diffraction effects which result in the production of diffraction fringes having diffraction peaks and minimums in the laser beam. Such diffraction peaks are quite undesirable, because such diffraction peaks may rise to intensity values which are sufficiently high to damage the optical device or other components of the laser system. The energy level in the laser beam is high and needs to be kept below the damage threshold, above which the energy level may be sufficiently high to damage some portion of the laser system.

To smooth out or minimize the production of diffraction peaks, the optical device 10 is provided with one or more scattering apodizers 26 in the path of the laser beam. Each apodizer 26 comprises a pattern of scattering elements which at least partially obscure the optical discontinuities formed by the interstices 18 and the corresponding portions of the supporting grid 16. Thus, the apodizer 26 has a pattern which corresponds to the layout of the interstices 18 and the corresponding portions of the supporting grid 16. Each illustrated apodizer 26 is in the form of a pattern of scattering elements arranged as stripes on a surface 28 of one of the transparent windows 24. In this case, both windows 24 are provided with apodizer patterns 26. It is noted that an apodizer pattern may also be formed on a reflective optical element, such as a turning mirror or beam splitter.

Each apodizer pattern 26 comprises a multiplicity of scattering elements which may be formed on the surface 28 of the transparent window 24. For example, the scattering elements may be formed as minute pits on the surface 28 by selectively and locally blasting the surface 28 with fine abrasive particles. It has been found that such particles should preferably be very fine and quite soft. For example, fine aluminum oxide particles have been employed successfully to produce the scattering elments by selectively blasting the surface 28 of the transparent window 24. Other suitable fine particles may be employed.

For effectively apodizing or smoothing the laser beam, the distribution density of the scattering elements should be nonuniform across the stripes or other elements of the apodizer pattern 26. Thus, the apodizer pattern 26 should have boundary portions 30 across which the distribution density of the scattering elements gradually tapers to zero, from the maximum value of the distribution density which occurs in the central or main portion 32 of the apodizer pattern 26. This small decreasing gradient of the distribution density smoothes over or minimizes the production of diffraction peaks in the laser beam.

It will be understood that each minute scattering element produces minor diffraction fringes, but the multitude of diffraction fringes produced by the multiplicity of scattering elements meld together, so that the net effect is virtually to eliminate intense diffraction peaks. Moreover, the apodizer pattern 26 of scattering elements prevents the production of diffraction peaks by the optical discontinuities represented by the interstices 18 and the supporting grid 16 which occupies such interstices.

Figure 2:
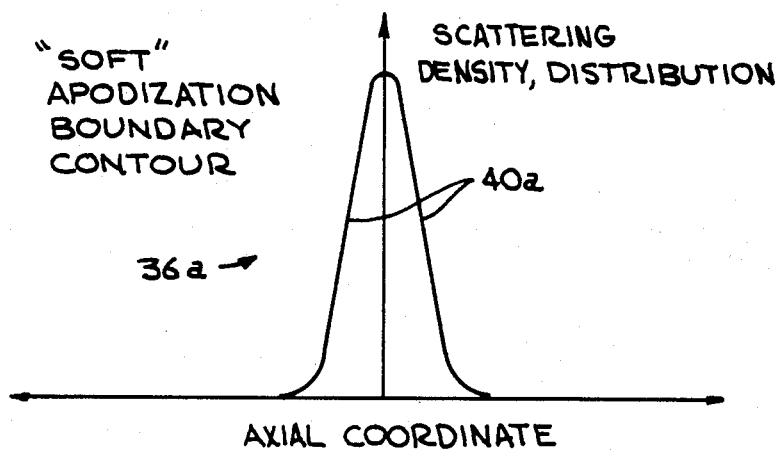
FIG. 2(a) is a set of graphs showing a soft or gradual apodization boundary contour and the corresponding intensity pattern in the laser beam, to illustrate the smoothing of diffraction effects by the apodizer.
FIG. 2(b) is a similar set of graphs, showing a hard or less gradual apodization boundary countour and the corresponding intensity pattern in the laser beam, indicating less effective suppression of diffraction effects.
Figure 2:
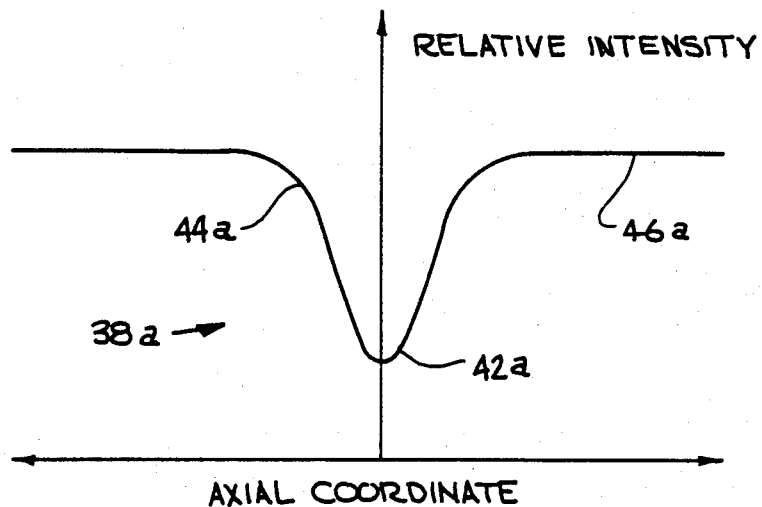
Figure 2:
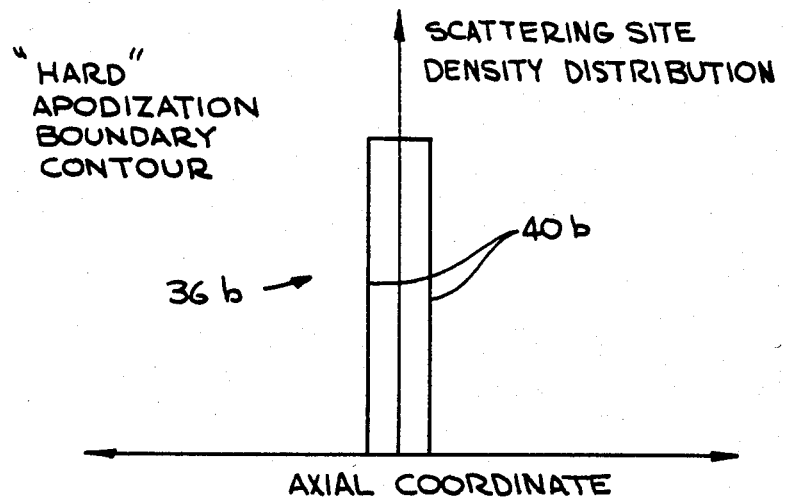
Figure 2:
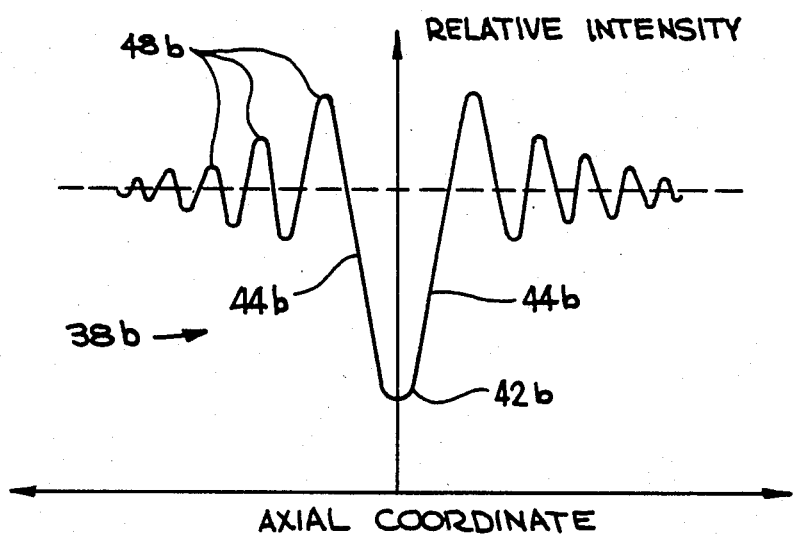

The importance of gradually tapering the boundary contours of the apodizer pattern 26 is illustrated in FIGS. 2(a) and 2(b). FIG. 2(a) comprises two graphs 36a and 38a. In the first graph, 36a, the boundary contours of the apodization pattern 26 is plotted to represent a "soft" or gradually tapering apodization boundary contour. In this graph, the distance from the axis or center of the apodizer pattern is plotted along the horizontal axis of the graph, while the relative density of scattering elements in the apodizer pattern is plotted along the vertical axis. The scattering efficiency is a function of the distribution density of the scattering elements. Thus, full transmission results from zero distribution density of the scattering elements.

The boundary contours of the apodizer pattern include gradually tapering slopes 40a, along which the distribution density of the scattering elements gradually tapers to zero, so that the scattering efficiency gradually tapers to zero.

The second graph, 38a, of FIG. 2(a) represents a plot of the light intensity across the portion of the laser beam affected by the apodizer pattern after propagation. It will be seen that the intensity drops to a minimize 42a near the center of zero axis of the apodizer pattern, and increases along tapering slopes 44a to full intensity levels 46a, with no significant diffraction peaks. Thus, the production of diffraction peaks is virtually eliminated by the soft or gradually tapering apodization boundary contour.

FIG. 2(b) comprises two similar graphs 36b and 38b, representing a "hard" or less gradual apodization boundary contour. The graph 36b includes discontinuities in the boundary slopes 40b which are much steeper and less gradually tapering than slopes 40a. The corresponding intensity 38b includes sizable and numerous diffraction peaks 48b.

The graphs 38a and 38b are simple sketches, but actual experimental studies have confirmed the substantial validity of the graphs and have shown that gradually tapering boundary contours for the apodizer pattern have the effect of smoothing out and virtually eliminating diffraction peaks so that diffraction effects are not a significant problem.

The scattering apodizer of the present invention can readily be implemented in practical embodiments and is low in cost. It can generally be implemented much more readily and economically than the previous method of apodization by varying transmission.

In an actual embodiment of the invention, diffraction peaks were completely eliminated, unlike transmission apodizers which only reduce beam intensity without eliminating the diffraction peaks. These weak diffraction peaks will grow in intensity under nonlinear propagation effects and will damage optical components.

The invention is not limited to transmissive optics but can be applied to reflective optics. For example, apodizer patterns can be formed on reflective, or partially reflective, mirrors.

The present invention is not limited to any particular laser beam wavelength. In one application, as an example, the optical device 10 of FIG. 1 may be employed with an input laser beam wavelength of 1054 nm in the infrared range, to produce a second harmonic output laser beam at about 527 nm, or a third harmonic output laser beam at about 351 nm.

The present invention also is not limited to surface apodization. It is expected that apodization may also be by a varying distribution of scattering elements below the surface.

What is claimed is:

1. A harmonic conversion device for converting a single input laser beam at a fundamental frequency to a single output laser beam at a harmonic frequency, said device being for use in a large aperture laser system, said device being comprised of a plurality of crystals which are fitted together to form a single conversion device of diameter sufficient for use in a large aperture laser system, a grid of divider elements provided between said crystals, said grid elements constituting optical discontinuities that produce diffraction peaks as a single laser beam is passed through all of the crystals of the conversion device, said device further comprising:
   transparent means for retaining said grid and crystals,
   a scattering apodizing pattern carried by said means,
   said pattern having a central portion overlying said grid of divider elements and a narrow boundary portion extending slightly beyond said grid elements, leaving the major portion of said crystals unobstructed for passage of a laser beam therethrough and conversion therein,
   said scattering pattern having a distribution density which is at a maximum in said central portion and which tapers gradually and smoothly to zero in said boundary portion to provide a gradient of said distribution density,
   said scattering pattern smoothing, reducing and minimizing the diffraction peaks produced by the optical discontinuities introduced by said grid elements.

2. The conversion device of claim 1, wherein said means is a pair of parallel transparent windows.

3. The conversion device of claim 2, wherein both of said windows carry said apodizing pattern.

4. The conversion device of claim 2 wherein said pattern includes at least a portion which is stripe like in form.

5. The conversion device of claim 2, wherein said pattern is comprised of minute pits in at least one of the windows.

6. The conversion device of claim 2, wherein said pattern of scattering elements is produced by selective blasting of the surface of at least one of said windows with fine abrasive particles.

7. The conversion device of claim 6, wherein said fine abrasive particles are made of aluminum oxide.

* * * * *